United States Patent
Kawamoto et al.

(12)

(10) Patent No.: US 6,524,983 B2
(45) Date of Patent: Feb. 25, 2003

(54) CERAMIC COMPOSITION AND CERAMIC CAPACITOR

(75) Inventors: Yasunobu Kawamoto, Tokyo (JP); Koichiro Morita, Tokyo (JP); Kenji Saito, Tokyo (JP); Hisamitsu Shizuno, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

(21) Appl. No.: 09/893,702

(22) Filed: Jun. 29, 2001

(65) Prior Publication Data
US 2002/0049131 A1 Apr. 25, 2002

(30) Foreign Application Priority Data
Jun. 30, 2000 (JP) ........................................ 2000-198356

(51) Int. Cl.$^7$ ............................................ C04B 35/468
(52) U.S. Cl. ...................................... 501/138; 501/139
(58) Field of Search ................................ 501/138, 137, 501/139

(56) References Cited

U.S. PATENT DOCUMENTS

| 5,268,342 A | * | 12/1993 | Nishiyama et al. | ......... 501/138 |
| 5,650,367 A | * | 7/1997 | Fujikawa et al. | ........... 501/139 |
| 6,319,871 B1 | * | 11/2001 | Sato et al. | .................. 501/136 |

\* cited by examiner

Primary Examiner—David Brunsman
(74) Attorney, Agent, or Firm—Bacon & Thomas

(57) ABSTRACT

The ceramic capacitor in accordance with the present invention is fabricated by employing a dielectric ceramic composition in forming dielectric layers thereof, wherein the dielectric ceramic composition contains an oxide of Ba and Ti, an oxide of Re (Re used herein represents one or more rare-earth elements selected from Sm, Eu, Gd, Tb, Dy, Ho, Er, Tm, Tb and Y) and one or more oxides selected from oxides of Mn, V and Cr, wherein the amount of the oxide of Ba and Ti is 100 mol % in terms of $BaTiO_3$, the amount of the oxide of Re is 0.25 to 1.5 mol % in terms of $Re_2O_3$ and the amount of one or more oxides of Mn, V or Cr is 0.03 to 0.6 mol % in terms of $Mn_2O_3$, $V_2O_5$, $Cr_2O_3$, respectively, wherein the ratio of Ba to Ti ranges between 0.970 and 1.030.

12 Claims, 1 Drawing Sheet

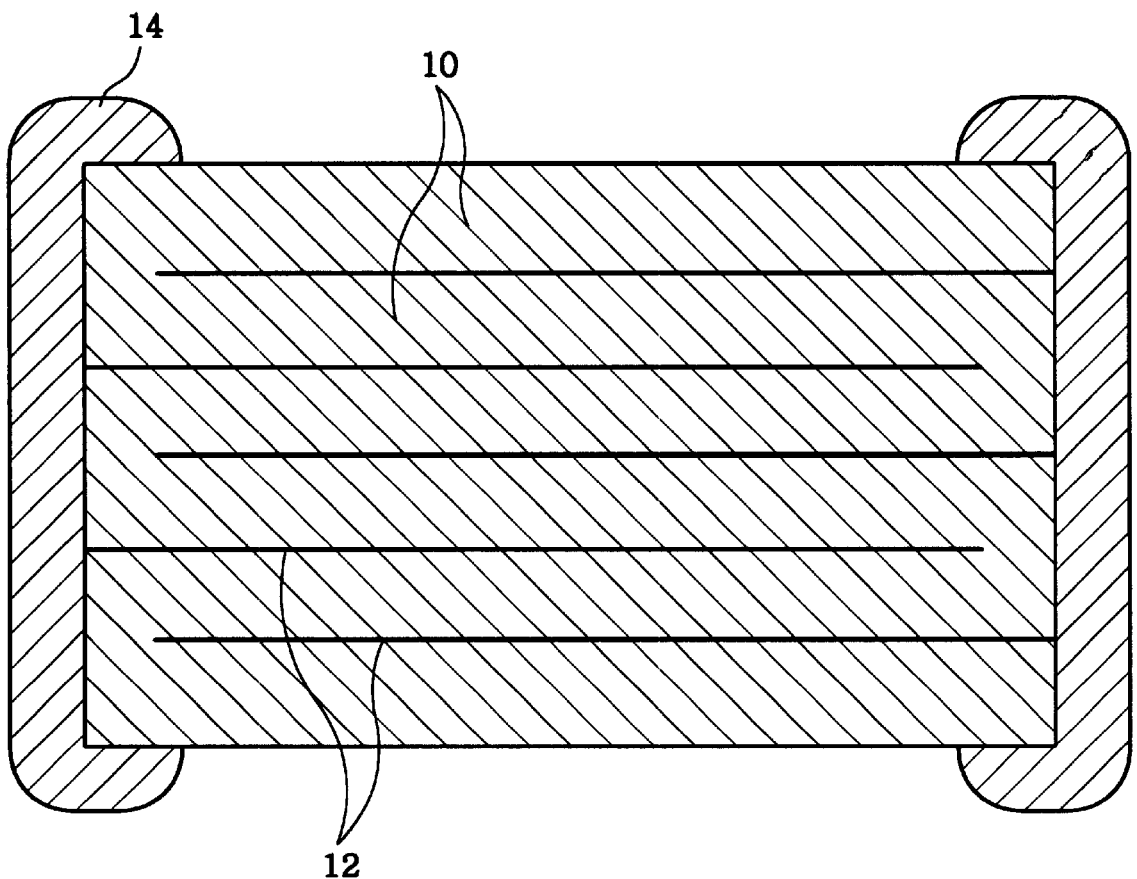

CERAMIC COMPOSITION AND CERAMIC CAPACITOR

FIELD OF THE INVENTION

The present invention relates to a ceramic capacitor and ceramic compositions therefor; and, more particularly, to reduction resistive dielectric ceramic compositions suitable for use as a dielectric layer of a ceramic capacitor having internal electrodes made of a base metal such as Ni and a ceramic capacitor fabricated by employing such ceramic compositions as a dielectric layer thereof.

BACKGROUND OF THE INVENTION

Recently, a base metal, e.g., Ni, is widely used in forming internal electrodes of multilayer ceramic capacitors for the purpose of reducing manufacturing costs. In case the internal electrodes are composed of the base metal, it is required that chip-shaped laminated bodies including therein the internal electrodes be sintered in a reductive atmosphere in order to prevent an oxidization of the internal electrodes. Accordingly, a variety of reduction resistive dielectric ceramic compositions have been developed.

Recent trend towards ever more miniaturized and dense electric circuits intensifies a demand for a further scaled down multilayer ceramic capacitor with higher capacitance. Keeping up with such demand, there has been made an effort to fabricate thinner dielectric layers and to stack a greater number of the thus produced dielectric layers.

However, when the dielectric layers are thinned out, a voltage applied to a unit thickness intrinsically increases. Accordingly, the operating life of the dielectric layers is shortened and thus a reliability of the multilayer ceramic capacitor is also deteriorated.

SUMMARY OF THE INVENTION

It is, therefore, an object of the present invention to provide highly reliable dielectric ceramic compositions and ceramic capacitors prepared by employing such dielectric ceramic compositions in forming dielectric layers thereof, wherein the dielectric ceramic compositions exhibit such electrical characteristics as a dielectric contstant equal to or greater than 3000, capacitance variation of −15% to +15% (based on a capacitance obtained at a temperature of +25° C.) in the temperature range from −55° C. to +125° C., a dielectric loss "tanδ" of 3.5% or less and an accelerated life of 200,000 seconds or greater.

In accordance with the present invention, there is provided a dielectric ceramic composition comprising: 100 mole parts of oxides of Ba and Ti, a ratio Ba/Ti being 0.970 to 1.030; 0.25 to 1.5 mole parts of an oxide of Re, Re representing one or more element selected from the group consisting of Sm, Eu, Gd, Tb, Dy, Ho, Er, Tm, Yb and Y; 0.2 to 1.5 mole parts of an oxide of Mg; and 0.03 to 0.6 mole parts of oxides of one or more elements selected from the group consisting of Mn, V and Cr.

BRIEF DESCRIPTION OF THE DRAWING

The above and other objects and features of the present invention will become apparent from the following description of preferred embodiments given in conjunction with the accompanying drawing:

The drawing represents a schematic cross sectional view illustrating a multilayer ceramic capacitor.

DETAILED DESCRIPTION OF THE PREFERRED EMBODIMENTS

Compound powders of $TiO_2$, $BaCO_3$, $Re_2O_3$, MgO, $Mn_2O_3$, $V_2O_5$, $Cr_2O_3$, $MoO_3$ and $WO_3$ were weighed in amounts as specified in the accompanying Tables 1-1 and 1-6, and mixed for about 20 hours by a wet method in a ball mill containing therein PSZ (partially sterilized zirconia) balls and water to thereby obtain a ceramic slurry. The produced ceramic slurry was dehydrated and then dried by being heated at about 150° C. for 6 hours.

TABLE 1-1

| | Dielectric Composition (mol %) | | | | | | | | |
|---|---|---|---|---|---|---|---|---|---|
| Sample | Rare-earth ($Re_2O_3$) | | | | | | Total | | Ba/Ti |
| Number | Element | Content | MgO | $Mn_2O_3$ | $V_2O_5$ | $Cr_2O_3$ | Content | $MoO_3$ | Ratio |
| 1 ✗ | Ho | 0.75 | 0.4 | 0.02 | | | 0.02 | 0.05 | 1.0050 |
| 2 ✗ | Ho | 0.75 | 0.4 | | 0.02 | | 0.02 | 0.05 | 1.0050 |
| 3 ✗ | Ho | 0.75 | 0.4 | | | 0.02 | 0.02 | 0.05 | 1.0050 |
| 4 | Ho | 0.75 | 0.4 | 0.03 | | | 0.03 | 0.05 | 1.0050 |
| 5 | Ho | 0.75 | 0.4 | | 0.03 | | 0.03 | 0.05 | 1.0050 |
| 6 | Ho | 0.75 | 0.4 | | | 0.03 | 0.03 | 0.05 | 1.0050 |
| 7 | Ho | 0.75 | 0.4 | 0.01 | 0.02 | | 0.03 | 0.05 | 1.0050 |
| 8 | Ho | 0.75 | 0.4 | 0.05 | 0.02 | | 0.07 | 0.05 | 1.0050 |
| 9 | Ho | 0.75 | 0.4 | 0.05 | | 0.2 | 0.25 | 0.05 | 1.0050 |
| 10 | Ho | 0.75 | 0.4 | 0.05 | 0.01 | 0.2 | 0.26 | 0.05 | 1.0050 |
| 11 | Ho | 0.75 | 0.4 | 0.05 | 0.05 | 0.2 | 0.3 | 0.05 | 1.0050 |
| 12 | Ho | 0.75 | 0.4 | 0.2 | 0.2 | 0.2 | 0.6 | 0.05 | 1.0050 |
| 13 | Ho | 0.75 | 0.4 | 0.6 | | | 0.6 | 0.05 | 1.0050 |
| 14 | Ho | 0.75 | 0.4 | | 0.6 | | 0.6 | 0.05 | 1.0050 |
| 15 | Ho | 0.75 | 0.4 | | | 0.6 | 0.6 | 0.05 | 1.0050 |
| 16 ✗ | Ho | 0.75 | 0.4 | 0.7 | | | 0.7 | 0.05 | 1.0050 |
| 17 ✗ | Ho | 0.75 | 0.4 | | 0.7 | | 0.7 | 0.05 | 1.0050 |
| 18 ✗ | Ho | 0.75 | 0.4 | | | 0.7 | 0.7 | 0.05 | 1.0050 |
| 19 | Ho | 0.75 | 0.4 | 0.05 | 0.1 | 0.1 | 0.25 | 0 | 1.0050 |
| 20 | Ho | 0.75 | 0.4 | 0.05 | 0.1 | 0.1 | 0.25 | 0.025 | 1.0050 |
| 21 | Ho | 0.75 | 0.4 | 0.05 | 0.1 | 0.1 | 0.25 | 0.1 | 1.0050 |

TABLE 1-1-continued

| Sample Number | Dielectric Composition (mol %) | | | | | | | | |
|---|---|---|---|---|---|---|---|---|---|
| | Rare-earth (Re$_2$O$_3$) | | MgO | Mn$_2$O$_3$ | V$_2$O$_5$ | Cr$_2$O$_3$ | Total Content | MoO$_3$ | Ba/Ti Ratio |
| | Element | Content | | | | | | | |
| 22 | Ho | 0.75 | 0.4 | 0.05 | 0.1 | 0.1 | 0.25 | 0.2 | 1.0050 |
| 23 | Ho | 0.75 | 0.4 | 0.05 | 0.1 | 0.1 | 0.25 | 0.3 | 1.0050 |
| 24 ※ | Ho | 0.75 | 0.4 | 0.05 | 0.1 | 0.1 | 0.25 | 0.4 | 1.0050 |
| 25 | Ho | 0.75 | 0.4 | 0.025 | 0.05 | 0.2 | 0.275 | 0.05 | 1.0050 |
| 26 ※ | Ho | 0.00 | 0.4 | 0.15 | 0.05 | 0.2 | 0.4 | 0.05 | 1.0050 |
| 27 | Ho | 0.25 | 0.4 | 0.15 | 0.05 | 0.2 | 0.4 | 0.05 | 1.0050 |
| 28 | Ho | 0.5 | 0.4 | 0.15 | 0.05 | 0.2 | 0.4 | 0.05 | 1.0050 |
| 29 | Ho | 1.0 | 0.4 | 0.15 | 0.05 | 0.2 | 0.4 | 0.05 | 1.0050 |

TABLE 1-2

| Sample Number | Dielectric Composition (mol %) | | | | | | | | |
|---|---|---|---|---|---|---|---|---|---|
| | Rare-earth (Re$_2$O$_3$) | | MgO | Mn$_2$O$_3$ | V$_2$O$_5$ | Cr$_2$O$_3$ | Total Content | MoO$_3$ | Ba/Ti Ratio |
| | Element | Content | | | | | | | |
| 30 | Ho | 1.5 | 0.4 | 0.15 | 0.05 | 0.2 | 0.4 | 0.05 | 1.0050 |
| 31 ※ | Ho | 2.0 | 0.4 | 0.15 | 0.05 | 0.2 | 0.4 | 0.05 | 1.0050 |
| 32 ※ | Ho | 4.0 | 0.4 | 0.15 | 0.05 | 0.2 | 0.4 | 0.05 | 1.0050 |
| 33 | Sm | 0.25 | 0.6 | 0.15 | 0.05 | 0.2 | 0.4 | 0.05 | 1.0050 |
| 34 | Sm | 0.75 | 0.6 | 0.15 | 0.05 | 0.2 | 0.4 | 0.05 | 1.0050 |
| 35 | Eu | 0.75 | 0.6 | 0.15 | 0.05 | 0.2 | 0.4 | 0.05 | 1.0050 |
| 36 | Gd | 0.75 | 0.6 | 0.15 | 0.05 | 0.2 | 0.4 | 0.05 | 1.0050 |
| 37 | Tb | 0.75 | 0.6 | 0.15 | 0.05 | 0.2 | 0.4 | 0.05 | 1.0050 |
| 38 | Dy | 0.75 | 0.6 | 0.15 | 0.05 | 0.2 | 0.4 | 0.05 | 1.0050 |
| 39 | Er | 0.75 | 0.3 | 0.15 | 0.05 | 0.2 | 0.4 | 0.05 | 1.0050 |
| 40 | Tm | 0.75 | 0.3 | 0.15 | 0.05 | 0.2 | 0.4 | 0.05 | 1.0050 |
| 41 | Yb | 0.75 | 0.3 | 0.15 | 0.05 | 0.2 | 0.4 | 0.05 | 1.0050 |
| 42 | Yb | 1.0 | 0.3 | 0.15 | 0.05 | 0.2 | 0.4 | 0.05 | 1.0050 |
| 43 | Y | 1.0 | 0.3 | 0.15 | 0.05 | 0.2 | 0.4 | 0.05 | 1.0050 |
| 44 | Ho/Dy | 0.5/0.5 | 0.4 | 0.15 | 0.05 | 0.2 | 0.4 | 0.05 | 1.0050 |
| 45 | Ho/Dy/Yb | 0.5/0.5/0.5 | 0.4 | 0.15 | 0.05 | 0.2 | 0.4 | 0.05 | 1.0050 |
| 46 | Sm/Ho/Yb | 0.2/0.5/0.1 | 0.4 | 0.15 | 0.05 | 0.2 | 0.4 | 0.05 | 1.0050 |
| 47 | Sm/Yb | 0.5/1.0 | 0.4 | 0.15 | 0.05 | 0.2 | 0.4 | 0.05 | 1.0050 |
| 48 ※ | Ho | 0.75 | 0 | 0.15 | 0.05 | 0.2 | 0.4 | 0.05 | 1.0050 |
| 49 | Ho | 0.75 | 0.2 | 0.15 | 0.05 | 0.2 | 0.4 | 0.05 | 1.0050 |
| 50 | Ho | 0.75 | 1.5 | 0.15 | 0.05 | 0.2 | 0.4 | 0.05 | 1.0050 |
| 51 ※ | Ho | 0.75 | 2.0 | 0.15 | 0.05 | 0.2 | 0.4 | 0.05 | 1.0050 |
| 52 ※ | Ho | 0.75 | 0.4 | 0.15 | 0.05 | 0.2 | 0.4 | 0.05 | 0.960 |
| 53 | Ho | 0.75 | 0.4 | 0.15 | 0.05 | 0.2 | 0.4 | 0.05 | 0.970 |
| 54 | Ho | 0.75 | 0.4 | 0.15 | 0.05 | 0.2 | 0.4 | 0.05 | 1.0070 |
| 55 | Ho | 0.75 | 0.4 | 0.15 | 0.05 | 0.2 | 0.4 | 0.05 | 1.030 |
| 56 ※ | Ho | 0.75 | 0.4 | 0.15 | 0.05 | 0.2 | 0.4 | 0.05 | 1.040 |

TABLE 1-3

| Sample Number | Dielectric Composition (mol %) | | | | | | | | |
|---|---|---|---|---|---|---|---|---|---|
| | Rare-earth (Re$_2$O$_3$) | | MgO | Mn$_2$O$_3$ | V$_2$O$_5$ | Cr$_2$O$_3$ | Total Content | WO$_3$ | Ba/Ti Ratio |
| | Element | Content | | | | | | | |
| 57 ※ | Ho | 0.75 | 0.4 | 0.02 | | | 0.02 | 0.05 | 1.0050 |
| 58 ※ | Ho | 0.75 | 0.4 | | 0.02 | | 0.02 | 0.05 | 1.0050 |
| 59 ※ | Ho | 0.75 | 0.4 | | | 0.02 | 0.02 | 0.05 | 1.0050 |
| 60 | Ho | 0.75 | 0.4 | 0.03 | | | 0.03 | 0.05 | 1.0050 |
| 61 | Ho | 0.75 | 0.4 | | 0.03 | | 0.03 | 0.05 | 1.0050 |
| 62 | Ho | 0.75 | 0.4 | | | 0.03 | 0.03 | 0.05 | 1.0050 |
| 63 | Ho | 0.75 | 0.4 | 0.01 | 0.02 | | 0.03 | 0.05 | 1.0050 |
| 64 | Ho | 0.75 | 0.4 | 0.05 | 0.02 | | 0.07 | 0.05 | 1.0050 |
| 65 | Ho | 0.75 | 0.4 | 0.05 | | 0.2 | 0.25 | 0.05 | 1.0050 |
| 66 | Ho | 0.75 | 0.4 | 0.05 | 0.01 | 0.2 | 0.26 | 0.05 | 1.0050 |
| 67 | Ho | 0.75 | 0.4 | 0.05 | 0.05 | 0.2 | 0.3 | 0.05 | 1.0050 |
| 68 | Ho | 0.75 | 0.4 | 0.2 | 0.2 | 0.2 | 0.6 | 0.05 | 1.0050 |

TABLE 1-3-continued

| Sample Number | Dielectric Composition (mol %) | | | | | | | |
|---|---|---|---|---|---|---|---|---|
| | Rare-earth (Re₂O₃) | | MgO | Mn₂O₃ | V₂O₅ | Cr₂O₃ | Total Content | WO₃ | Ba/Ti Ratio |
| | Element | Content | | | | | | | |
| 69 | Ho | 0.75 | 0.4 | 0.6 | | | 0.6 | 0.05 | 1.0050 |
| 70 | Ho | 0.75 | 0.4 | | 0.6 | | 0.6 | 0.05 | 1.0050 |
| 71 | Ho | 0.75 | 0.4 | | | 0.6 | 0.6 | 0.05 | 1.0050 |
| 72 ※ | Ho | 0.75 | 0.4 | 0.7 | | | 0.7 | 0.05 | 1.0050 |
| 73 ※ | Ho | 0.75 | 0.4 | | 0.7 | | 0.7 | 0.05 | 1.0050 |
| 74 ※ | Ho | 0.75 | 0.4 | | | 0.7 | 0.7 | 0.05 | 1.0050 |
| 75 | Ho | 0.75 | 0.4 | 0.05 | 0.1 | 0.1 | 0.25 | 0 | 1.0050 |
| 76 | Ho | 0.75 | 0.4 | 0.05 | 0.1 | 0.1 | 0.25 | 0.025 | 1.0050 |
| 77 | Ho | 0.75 | 0.4 | 0.05 | 0.1 | 0.1 | 0.25 | 0.05 | 1.0050 |
| 78 | Ho | 0.75 | 0.4 | 0.05 | 0.1 | 0.1 | 0.25 | 0.1 | 1.0050 |
| 79 | Ho | 0.75 | 0.4 | 0.05 | 0.1 | 0.1 | 0.25 | 0.2 | 1.0050 |
| 80 | Ho | 0.75 | 0.4 | 0.05 | 0.1 | 0.1 | 0.25 | 0.3 | 1.0050 |
| 81 ※ | Ho | 0.75 | 0.4 | 0.05 | 0.1 | 0.1 | 0.25 | 0.4 | 1.0050 |
| 82 | Ho | 0.75 | 0.4 | 0.025 | 0.05 | 0.2 | 0.275 | 0.05 | 1.0050 |
| 83 ※ | Ho | 0.00 | 0.4 | 0.15 | 0.05 | 0.2 | 0.4 | 0.05 | 1.0050 |
| 84 | Ho | 0.25 | 0.4 | 0.15 | 0.05 | 0.2 | 0.4 | 0.05 | 1.0050 |
| 85 | Ho | 0.5 | 0.4 | 0.15 | 0.05 | 0.2 | 0.4 | 0.05 | 1.0050 |

TABLE 1-4

| Sample Number | Dielectric Composition (mol %) | | | | | | | | |
|---|---|---|---|---|---|---|---|---|---|
| | Rare-earth (Re₂O₃) | | MgO | Mn₂O₃ | V₂O₅ | Cr₂O₃ | Total Content | WO₃ | Ba/Ti Ratio |
| | Element | Content | | | | | | | |
| 86 | Ho | 1.0 | 0.4 | 0.15 | 0.05 | 0.2 | 0.4 | 0.05 | 1.0050 |
| 87 | Ho | 1.5 | 0.4 | 0.15 | 0.05 | 0.2 | 0.4 | 0.05 | 1.0050 |
| 88 ※ | Ho | 2.0 | 0.4 | 0.15 | 0.05 | 0.2 | 0.4 | 0.05 | 1.0050 |
| 89 ※ | Ho | 4.0 | 0.4 | 0.15 | 0.05 | 0.2 | 0.4 | 0.05 | 1.0050 |
| 90 | Sm | 0.25 | 0.6 | 0.15 | 0.05 | 0.2 | 0.4 | 0.05 | 1.0050 |
| 91 | Sm | 0.75 | 0.6 | 0.15 | 0.05 | 0.2 | 0.4 | 0.05 | 1.0050 |
| 92 | Eu | 0.75 | 0.6 | 0.15 | 0.05 | 0.2 | 0.4 | 0.05 | 1.0050 |
| 93 | Gd | 0.75 | 0.6 | 0.15 | 0.05 | 0.2 | 0.4 | 0.05 | 1.0050 |
| 94 | Tb | 0.75 | 0.6 | 0.15 | 0.05 | 0.2 | 0.4 | 0.05 | 1.0050 |
| 95 | Dy | 0.75 | 0.6 | 0.15 | 0.05 | 0.2 | 0.4 | 0.05 | 1.0050 |
| 96 | Er | 0.75 | 0.3 | 0.15 | 0.05 | 0.2 | 0.4 | 0.05 | 1.0050 |
| 97 | Tm | 0.75 | 0.3 | 0.15 | 0.05 | 0.2 | 0.4 | 0.05 | 1.0050 |
| 98 | Yb | 0.75 | 0.3 | 0.15 | 0.05 | 0.2 | 0.4 | 0.05 | 1.0050 |
| 99 | Yb | 1.0 | 0.3 | 0.15 | 0.05 | 0.2 | 0.4 | 0.05 | 1.0050 |
| 100 | Y | 1.0 | 0.3 | 0.15 | 0.05 | 0.2 | 0.4 | 0.05 | 1.0050 |
| 101 | Ho/Dy | 0.5/0.5 | 0.4 | 0.15 | 0.05 | 0.2 | 0.4 | 0.05 | 1.0050 |
| 102 | Ho/Dy/Yb | 0.5/0.5/0.5 | 0.4 | 0.15 | 0.05 | 0.2 | 0.4 | 0.05 | 1.0050 |
| 103 | Sm/Ho/Yb | 0.2/0.5/0.1 | 0.4 | 0.15 | 0.05 | 0.2 | 0.4 | 0.05 | 1.0050 |
| 104 | Sm/Yb | 0.5/1.0 | 0.4 | 0.15 | 0.05 | 0.2 | 0.4 | 0.05 | 1.0050 |
| 105 ※ | Ho | 0.75 | 0 | 0.15 | 0.05 | 0.2 | 0.4 | 0.05 | 1.0050 |
| 106 | Ho | 0.75 | 0.2 | 0.15 | 0.05 | 0.2 | 0.4 | 0.05 | 1.0050 |
| 107 | Ho | 0.75 | 1.5 | 0.15 | 0.05 | 0.2 | 0.4 | 0.05 | 1.0050 |
| 108 ※ | Ho | 0.75 | 2.0 | 0.15 | 0.05 | 0.2 | 0.4 | 0.05 | 1.0050 |
| 109 ※ | Ho | 0.75 | 0.4 | 0.15 | 0.05 | 0.2 | 0.4 | 0.05 | 0.960 |
| 110 | Ho | 0.75 | 0.4 | 0.15 | 0.05 | 0.2 | 0.4 | 0.05 | 0.970 |
| 111 | Ho | 0.75 | 0.4 | 0.15 | 0.05 | 0.2 | 0.4 | 0.05 | 1.0070 |
| 112 | Ho | 0.75 | 0.4 | 0.15 | 0.05 | 0.2 | 0.4 | 0.05 | 1.030 |
| 113 ※ | Ho | 0.75 | 0.4 | 0.15 | 0.05 | 0.2 | 0.4 | 0.05 | 1.040 |

TABLE 1-5

| Sample Number | Dielectric Composition (mol %) | | | | | | | | | |
|---|---|---|---|---|---|---|---|---|---|---|
| | Rare-earth (Re₂O₃) | | MgO | Mn₂O₃ | V₂O₅ | Cr₂O₃ | Total Content | MoO₃ | WO₃ | Total Content | Ba/Ti Ratio |
| | Element | Content | | | | | | | | | |
| 114 ※ | Ho | 0.75 | 0.4 | 0.02 | | | 0.02 | 0.025 | 0.025 | 0.05 | 1.0050 |
| 115 ※ | Ho | 0.75 | 0.4 | | 0.02 | | 0.02 | 0.025 | 0.025 | 0.05 | 1.0050 |

TABLE 1-5-continued

| | Dielectric Composition (mol %) | | | | | | | | | | |
|---|---|---|---|---|---|---|---|---|---|---|---|
| Sample Number | Rare-earth (Re₂O₃) | | MgO | Mn₂O₃ | V₂O₅ | Cr₂O₃ | Total Content | MoO₃ | WO₃ | Total Content | Ba/Ti Ratio |
| | Element | Content | | | | | | | | | |
| 116 ✗ | Ho | 0.75 | 0.4 | | | 0.02 | 0.02 | 0.025 | 0.025 | 0.05 | 1.0050 |
| 117 | Ho | 0.75 | 0.4 | 0.03 | | | 0.03 | 0.025 | 0.025 | 0.05 | 1.0050 |
| 118 | Ho | 0.75 | 0.4 | | 0.03 | | 0.03 | 0.025 | 0.025 | 0.05 | 1.0050 |
| 119 | Ho | 0.75 | 0.4 | | | 0.03 | 0.03 | 0.025 | 0.025 | 0.05 | 1.0050 |
| 120 | Ho | 0.75 | 0.4 | 0.01 | 0.02 | | 0.03 | 0.025 | 0.025 | 0.05 | 1.0050 |
| 121 | Ho | 0.75 | 0.4 | 0.05 | 0.02 | | 0.07 | 0.025 | 0.025 | 0.05 | 1.0050 |
| 122 | Ho | 0.75 | 0.4 | 0.05 | | 0.2 | 0.25 | 0.025 | 0.025 | 0.05 | 1.0050 |
| 123 | Ho | 0.75 | 0.4 | 0.05 | 0.01 | 0.2 | 0.26 | 0.025 | 0.025 | 0.05 | 1.0050 |
| 124 | Ho | 0.75 | 0.4 | 0.05 | 0.05 | 0.2 | 0.3 | 0.025 | 0.025 | 0.05 | 1.0050 |
| 125 | Ho | 0.75 | 0.4 | 0.2 | 0.2 | 0.2 | 0.6 | 0.025 | 0.025 | 0.05 | 1.0050 |
| 126 | Ho | 0.75 | 0.4 | 0.6 | | | 0.6 | 0.025 | 0.025 | 0.05 | 1.0050 |
| 127 | Ho | 0.75 | 0.4 | | 0.6 | | 0.6 | 0.025 | 0.025 | 0.05 | 1.0050 |
| 128 | Ho | 0.75 | 0.4 | | | 0.6 | 0.6 | 0.025 | 0.025 | 0.05 | 1.0050 |
| 129 ✗ | Ho | 0.75 | 0.4 | 0.7 | | | 0.7 | 0.025 | 0.025 | 0.05 | 1.0050 |
| 130 ✗ | Ho | 0.75 | 0.4 | | 0.7 | | 0.7 | 0.025 | 0.025 | 0.05 | 1.0050 |
| 131 ✗ | Ho | 0.75 | 0.4 | | | 0.7 | 0.7 | 0.025 | 0.025 | 0.05 | 1.0050 |
| 132 | Ho | 0.75 | 0.4 | 0.05 | 0.1 | 0.1 | 0.25 | 0 | 0 | 0 | 1.0050 |
| 133 | Ho | 0.75 | 0.4 | 0.05 | 0.1 | 0.1 | 0.25 | 0.0125 | 0.0125 | 0.025 | 1.0050 |
| 134 | Ho | 0.75 | 0.4 | 0.05 | 0.1 | 0.1 | 0.25 | 0.05 | 0.05 | 0.1 | 1.0050 |
| 135 | Ho | 0.75 | 0.4 | 0.05 | 0.1 | 0.1 | 0.25 | 0.1 | 0.1 | 0.2 | 1.0050 |
| 136 | Ho | 0.75 | 0.4 | 0.05 | 0.1 | 0.1 | 0.25 | 0.15 | 0.15 | 0.3 | 1.0050 |
| 137 ✗ | Ho | 0.75 | 0.4 | 0.05 | 0.1 | 0.1 | 0.25 | 0.2 | 0.2 | 0.4 | 1.0050 |
| 138 | Ho | 0.75 | 0.4 | 0.025 | 0.05 | 0.2 | 0.275 | 0.025 | 0.025 | 0.05 | 1.0050 |
| 139 ✗ | Ho | 0.00 | 0.4 | 0.15 | 0.05 | 0.2 | 0.4 | 0.025 | 0.025 | 0.05 | 1.0050 |
| 140 | Ho | 0.25 | 0.4 | 0.15 | 0.05 | 0.2 | 0.4 | 0.025 | 0.025 | 0.05 | 1.0050 |
| 141 | Ho | 0.5 | 0.4 | 0.15 | 0.05 | 0.2 | 0.4 | 0.025 | 0.025 | 0.05 | 1.0050 |
| 142 | Ho | 1.0 | 0.4 | 0.15 | 0.05 | 0.2 | 0.4 | 0.025 | 0.025 | 0.05 | 1.0050 |

TABLE 1-6

| | Dielectric Composition (mol %) | | | | | | | | | | |
|---|---|---|---|---|---|---|---|---|---|---|---|
| Sample Number | Rare-earth (Re₂O₃) | | MgO | Mn₂O₃ | V₂O₅ | Cr₂O₃ | Total Content | MoO₃ | WO₃ | Total Content | Ba/Ti Ratio |
| | Element | Content | | | | | | | | | |
| 143 | Ho | 1.5 | 0.4 | 0.15 | 0.05 | 0.2 | 0.4 | 0.025 | 0.025 | 0.05 | 1.0050 |
| 144 ✗ | Ho | 2.0 | 0.4 | 0.15 | 0.05 | 0.2 | 0.4 | 0.025 | 0.025 | 0.05 | 1.0050 |
| 145 ✗ | Ho | 4.0 | 0.4 | 0.15 | 0.05 | 0.2 | 0.4 | 0.025 | 0.025 | 0.05 | 1.0050 |
| 146 | Sm | 0.25 | 0.6 | 0.15 | 0.05 | 0.2 | 0.4 | 0.025 | 0.025 | 0.05 | 1.0050 |
| 147 | Sm | 0.75 | 0.6 | 0.15 | 0.05 | 0.2 | 0.4 | 0.025 | 0.025 | 0.05 | 1.0050 |
| 148 | Eu | 0.75 | 0.6 | 0.15 | 0.05 | 0.2 | 0.4 | 0.025 | 0.025 | 0.05 | 1.0050 |
| 149 | Gd | 0.75 | 0.6 | 0.15 | 0.05 | 0.2 | 0.4 | 0.025 | 0.025 | 0.05 | 1.0050 |
| 150 | Tb | 0.75 | 0.6 | 0.15 | 0.05 | 0.2 | 0.4 | 0.025 | 0.025 | 0.05 | 1.0050 |
| 151 | Dy | 0.75 | 0.6 | 0.15 | 0.05 | 0.2 | 0.4 | 0.025 | 0.025 | 0.05 | 1.0050 |
| 152 | Er | 0.75 | 0.3 | 0.15 | 0.05 | 0.2 | 0.4 | 0.025 | 0.025 | 0.05 | 1.0050 |
| 153 | Tm | 0.75 | 0.3 | 0.15 | 0.05 | 0.2 | 0.4 | 0.025 | 0.025 | 0.05 | 1.0050 |
| 154 | Yb | 0.75 | 0.3 | 0.15 | 0.05 | 0.2 | 0.4 | 0.025 | 0.025 | 0.05 | 1.0050 |
| 155 | Yb | 1.0 | 0.3 | 0.15 | 0.05 | 0.2 | 0.4 | 0.025 | 0.025 | 0.05 | 1.0050 |
| 156 | Y | 1.0 | 0.3 | 0.15 | 0.05 | 0.2 | 0.4 | 0.025 | 0.025 | 0.05 | 1.0050 |
| 157 | Ho/Dy | 0.5/0.5 | 0.4 | 0.15 | 0.05 | 0.2 | 0.4 | 0.025 | 0.025 | 0.05 | 1.0050 |
| 158 | Ho/Dy/Yb | 0.5/0.5/0.5 | 0.4 | 0.15 | 0.05 | 0.2 | 0.4 | 0.025 | 0.025 | 0.05 | 1.0050 |
| 159 | Sm/Ho/Yb | 0.2/0.5/0.1 | 0.4 | 0.15 | 0.05 | 0.2 | 0.4 | 0.025 | 0.025 | 0.05 | 1.0050 |
| 160 | Sm/Yb | 0.5/1.0 | 0.4 | 0.15 | 0.05 | 0.2 | 0.4 | 0.025 | 0.025 | 0.05 | 1.0050 |
| 161 ✗ | Ho | 0.75 | 0 | 0.15 | 0.05 | 0.2 | 0.4 | 0.025 | 0.025 | 0.05 | 1.0050 |
| 162 | Ho | 0.75 | 0.2 | 0.15 | 0.05 | 0.2 | 0.4 | 0.025 | 0.025 | 0.05 | 1.0050 |
| 163 | Ho | 0.75 | 1.5 | 0.15 | 0.05 | 0.2 | 0.4 | 0.025 | 0.025 | 0.05 | 1.0050 |
| 164 ✗ | Ho | 0.75 | 2.0 | 0.15 | 0.05 | 0.2 | 0.4 | 0.025 | 0.025 | 0.05 | 1.0050 |
| 165 ✗ | Ho | 0.75 | 0.4 | 0.15 | 0.05 | 0.2 | 0.4 | 0.025 | 0.025 | 0.05 | 0.960 |
| 166 | Ho | 0.75 | 0.4 | 0.15 | 0.05 | 0.2 | 0.4 | 0.025 | 0.025 | 0.05 | 0.970 |
| 167 | Ho | 0.75 | 0.4 | 0.15 | 0.05 | 0.2 | 0.4 | 0.025 | 0.025 | 0.05 | 1.0070 |
| 168 | Ho | 0.75 | 0.4 | 0.15 | 0.05 | 0.2 | 0.4 | 0.025 | 0.025 | 0.05 | 1.030 |
| 169 ✗ | Ho | 0.75 | 0.4 | 0.15 | 0.05 | 0.2 | 0.4 | 0.025 | 0.025 | 0.05 | 1.040 |

Thereafter, the dried ceramic slurry was ground and then calcined in air at about 800° C. for 6 hours. The calcined slurry was then disaggregated by a wet method in a ball mill added with ethanol for 6 hours. Next, the disaggregated ceramic slurry was dried by being heated at about 150° C.

for 6 hours, thereby obtaining the powder of the calcined ceramic slurry.

In a following step, a dielectric ceramic slurry was obtained by mixing and grinding 1000 g (100 parts by weight) of the powder of the dielectric ceramic slurry, 15 wt % of an organic binder and 50 wt % of water in a ball mill, wherein the organic binder includes acrylic ester polymer, glycerin, and a solution of condensed phosphate.

Next, the dielectric slurry was subjected to a vacuum air separator to remove air bubbles therefrom and formed into a thin film coated on a polyester film by using a reverse roll coater. Thus produced ceramic thin film on the polyester film was heated and dried at about 100° C., and then diced to thereby obtain square ceramic green sheets having a thickness of about 5 $\mu$m and a size of about 10 cm×10 cm.

Meanwhile, 0.9 g of ethyl cellulose dissolved in 9.1 g of butyl carbitol and 10 g of Nickel powder having an average diameter of about 0.5 $\mu$m were loaded and stirred in a stirrer for 10 hours to form a conductive paste for use in forming internal electrodes of ceramic capacitor. Thereafter, the conductive paste was printed on the prepared ceramic green sheets to form conductive patterns thereon and then the printed conductive paste was dried.

Subsequently, ten ceramic green sheets having the conductive patterns thereon were stacked against each other with the conductive patterns facing upward, thereby forming a laminated body. Every two neighboring sheets were disposed in such a manner that the conductive patterns provided thereon were shifted by one half of a pattern size along the length direction. The laminated body also included one or more ceramic dummy sheets stacked against each of the uppermost and the lowermost ceramic green sheets having conductive patterns thereon, the ceramic dummy sheets representing ceramic green sheets without having conductive patterns thereon.

Next, the laminated body was pressed with a load of about 40 tons at about 50° C. along the stacking direction of the ceramic sheets in the laminated body. Afterwards, the pressed laminated body was diced into a multiplicity of chip shaped ceramic bodies having a size of about 3.2 mm×1.6 mm.

Thereafter, Ni external electrodes were formed at two opposite sides of each respective chip shaped ceramic body by, e.g., a dipping method, one end portion of each of the internal electrodes being exposed to one of the two opposite sides of each chip shaped ceramic body. Then, the chip shaped ceramic bodies were loaded into a furnace capable of controlling an atmosphere therein and the organic binder contained in the loaded ceramic bodies was removed by heating the furnace in an $N_2$ atmosphere. Then, the binder-removed chip shaped ceramic bodies were sintered at about 1300° C. in a non-oxidative atmosphere with oxygen partial pressure being in $10^{-5}$ to $10^{-10}$ atm order range. Thereafter, the sintered chip-shaped ceramic bodies were re-oxidized in an oxidative atmosphere to thereby obtain multilayer ceramic capacitors as shown in the drawing wherein reference numerals 10, 12 and 14 represent dielectric layers, internal electrodes and external electrodes, respectively.

Tables 2-1 to 2-6 exhibit a measurement result of electrical characteristics obtained from the thus produced multilayer ceramic capacitors, wherein a thickness of each dielectric layer incorporated in the capacitors was about 3 $\mu$m.

The electrical characteristics of the multilayer ceramic capacitors were obtained as follows.

(A) Relative permittivity (or dielectric constant) $\epsilon_s$ was computed based on a facing area of a pair of neighboring internal electrodes, a thickness of a dielectric layer positioned between the pair of neighboring internal electrodes, and the capacitance of a multilayer ceramic capacitor obtained under the condition of applying at 20° C. a voltage of 1.0 V (root mean square value) with a frequency of 1 kHz.

(B) Dielectric loss tan $\delta$ (%) was obtained under the same condition as established for measuring the permittivity cited above.

(C) Resistivity ($\Omega$ cm) was acquired by measuring a resistance between a pair of external electrodes after DC 25 V was applied for 60 seconds at 20° C. The number following "E" in the notation of a resistivity value presented in the accompanying Tables 2-1 to 2-6 represents an order. For instance, 2.5 E+12 represents $2.5 \times 10^{12}$.

(D) Accelerated life (second) was obtained by measuring time period until an insulation resistivity ($\rho$) becomes $1 \times 10^{10}$ $\Omega$ cm in a DC electric field of 20 V/$\mu$m at a temperature of 150° C.

(E) Capacitance variation $\Delta$ C/C$_{25}$ (%) was obtained by measuring capacitances at −55° C., +25° C. and +125° C. in a thermostatic (or constant temperature) oven under the condition of applying a voltage of 1 V (rms value) with a frequency of 1 KHz, wherein $C_{25}$ represents a capacitance at 25° C. and $\Delta$ C represents the difference between $C_{25}$ and a capacitance measured at −55° C. to 125° C.

TABLE 2-1

| Sample Number | Sintering Temperature (° C.) | Permittivity | Tanδ (%) | Resistivity (Ω cm) at Room Temperature | Capacitance Variation ΔC/C$_{25}$ (%) | | Accelerated Life (sec) |
|---|---|---|---|---|---|---|---|
| | | | | | −55° C. | 125° C. | |
| 1✗ | 1300 | 3780 | 3.3 | 2.5E + 12 | −13.4 | −14.9 | 45,800 |
| 2✗ | 1300 | 3860 | 3.2 | 6.7E + 12 | −14.6 | −14.3 | 165,800 |
| 3✗ | 1300 | 3850 | 3.7 | 2.0E + 12 | −14.8 | −15 | 870 |
| 4 | 1300 | 3790 | 3.0 | 4.5E + 12 | −14 | −14.9 | 287,900 |
| 5 | 1300 | 3530 | 2.9 | 6.9E + 12 | −13.4 | −14.6 | 875,900 |
| 6 | 1300 | 3680 | 3.4 | 8.1E + 11 | −13.3 | −14.4 | 458,900 |
| 7 | 1300 | 3790 | 3.4 | 9.4E + 11 | −12.5 | −14.7 | 678,940 |
| 8 | 1300 | 3890 | 3.3 | 5.3E + 12 | −13.9 | −13.5 | 897,500 |
| 9 | 1300 | 3850 | 3.4 | 7.4E + 12 | −14.5 | −14.3 | 658,900 |
| 10 | 1300 | 3870 | 3.5 | 4.6E + 12 | −14.5 | −14.9 | 764,900 |

TABLE 2-1-continued

| Sample Number | Sintering Temperature (° C.) | Permittivity | Tanδ (%) | Resistivity (Ω cm) at Room Temperature | Capacitance Variation ΔC/C$_{25}$ (%) −55° C. | 125° C. | Accelerated Life (sec) |
|---|---|---|---|---|---|---|---|
| 11 | 1300 | 3750 | 3.4 | 5.6E + 12 | −14.4 | −14.5 | 759,800 |
| 12 | 1300 | 3890 | 3.2 | 2.2E + 12 | 9 | −14.6 | 983,450 |
| 13 | 1300 | 3590 | 3.0 | 5.9E + 12 | −12.9 | −14.9 | 398,500 |
| 14 | 1300 | 3740 | 3.0 | 9.5E + 11 | −14.5 | −14.5 | 875,930 |
| 15 | 1300 | 3640 | 3.4 | 8.8E + 12 | −14.5 | −14.1 | 754,900 |
| 16X | 1300 | 3300 | 3.1 | 2.5E + 12 | −13.5 | −13.4 | 987,500 |
| 17X | 1300 | 3180 | 3.0 | 4.9E + 12 | −12.4 | −13.5 | 1,496,000 |
| 18X | 1300 | 3480 | 3.4 | 7.6E + 12 | −13 | −14.9 | 289,540 |
| 19 | 1300 | 3870 | 3.4 | 4.3E + 12 | −14.4 | −14.8 | 243,900 |
| 20 | 1300 | 3670 | 3.4 | 4.7E + 13 | −13.4 | −14.4 | 456,700 |
| 21 | 1300 | 3890 | 3.5 | 5.3E + 12 | −14.9 | −14.6 | 1,489,000 |
| 22 | 1300 | 3780 | 3.5 | 1.0E + 13 | −14.5 | −15 | 2,985,000 |
| 23 | 1300 | 3680 | 3.1 | 2.0E + 13 | −13.9 | −14.5 | 1,894,500 |
| 24X | 1300 | 3650 | 3.8 | 4.4E + 11 | −14.6 | −3.5 | 19,800 |
| 25 | 1300 | 3850 | 3.4 | 8.4E + 13 | −14.5 | −14.9 | 598,700 |
| 26X | 1300 | 5980 | 9.4 | 8.5E + 12 | −14.5 | −25.2 | 390 |
| 27 | 1300 | 3560 | 3.5 | 5.6E + 12 | −14.5 | −14.6 | 578,900 |
| 28 | 1300 | 3850 | 3.5 | 1.2E + 12 | −14.5 | −15 | 459,680 |
| 29 | 1300 | 3500 | 3.4 | 9.5E + 12 | −14.5 | −14.6 | 1,098,700 |

TABLE 2-2

| Sample Number | Sintering Temperature (° C.) | Permittivity | Tanδ (%) | Resistivity (Ωcm) at Room Temperature | Capacitance Variation ΔC/C$_{25}$ (%) −55° C. | 125° C. | Accelerated Life (sec) |
|---|---|---|---|---|---|---|---|
| 30 | 1300 | 3690 | 3.5 | 8.6E + 12 | −14.6 | −15 | 476,900 |
| 31X | 1300 | Incapable of obtaining a sintered ceramic with high density | | | | | |
| 32X | 1300 | Incapable of obtaining a sintered ceramic with high density | | | | | |
| 33 | 1300 | 3780 | 3.5 | 1.4E + 12 | −14.5 | −14.6 | 475,980 |
| 34 | 1300 | 3690 | 3.4 | 4.6E + 12 | −14.5 | −14.8 | 389,500 |
| 35 | 1300 | 3890 | 3.5 | 2.5E + 12 | −14.4 | −14.9 | 389,700 |
| 36 | 1300 | 3650 | 3.5 | 1.4E + 12 | −13.8 | −13.4 | 498,030 |
| 37 | 1300 | 3780 | 3.4 | 8.4E + 12 | −15 | −13.3 | 274,900 |
| 38 | 1300 | 3890 | 3.3 | 3.5E + 12 | −14.5 | −15 | 367,800 |
| 39 | 1300 | 3840 | 3.5 | 1.0E + 12 | −14.3 | −14.5 | 389,500 |
| 40 | 1300 | 3510 | 3.5 | 1.8E + 12 | −14.5 | −15 | 398,000 |
| 41 | 1300 | 3670 | 3.1 | 6.5E + 12 | −14.5 | −14.5 | 489,700 |
| 42 | 1300 | 3790 | 3.0 | 4.6E + 12 | −14.6 | −14.6 | 354,700 |
| 43 | 1300 | 3890 | 3.5 | 5.7E + 11 | −14.5 | −14.5 | 897,600 |
| 44 | 1300 | 3890 | 3.3 | 5.5E + 12 | −14.4 | −14.9 | 456,900 |
| 45 | 1300 | 4020 | 3.5 | 1.0E + 11 | −14.5 | −15 | 498,700 |
| 46 | 1300 | 3790 | 3.5 | 5.5E + 12 | −14.1 | −14.5 | 569,000 |
| 47 | 1300 | 3580 | 3.3 | 1.4E + 12 | −14.5 | −14.5 | 328,800 |
| 48X | 1300 | 7960 | 14.4 | 2.6E + 11 | −35.9 | −1.4 | 760 |
| 49 | 1300 | 3890 | 3.5 | 4.1E + 12 | −14.5 | −14.6 | 289,700 |
| 50 | 1300 | 3870 | 2.6 | 1.6E + 12 | −13.5 | −14.1 | 240,040 |
| 51X | 1300 | 2340 | 3.5 | 1.4E + 12 | −13.9 | −16.7 | 480 |
| 52X | 1300 | Incapable of obtaining a sintered ceramic with high density | | | | | |
| 53 | 1300 | 3690 | 3.5 | 2.1E + 13 | −14.6 | −14.9 | 348,990 |
| 54 | 1300 | 3650 | 3.3 | 4.4E + 13 | −14.5 | −14.5 | 387,500 |
| 55 | 1300 | 3790 | 3.5 | 4.1E + 13 | −14.5 | −14.7 | 365,900 |
| 56X | 1300 | 3080 | 3.1 | 4.9E + 13 | −14.5 | −14.5 | 4,800 |

TABLE 2-3

| Sample Number | Sintering Temperature (° C.) | Permittivity | Tanδ (%) | Resistivity (Ω cm) at Room Temperature | Capacitance Variation ΔC/C$_{25}$ (%) −55° C. | 125° C. | Accelerated Life (sec) |
|---|---|---|---|---|---|---|---|
| 57X | 1300 | 3850 | 3.3 | 8.3E + 12 | −14.1 | −14.9 | 147,500 |
| 58X | 1300 | 3740 | 3.4 | 7.7E + 12 | −14.8 | −14.2 | 165,900 |
| 59X | 1300 | 3920 | 3.9 | 5.2E + 12 | −14.6 | −14.3 | 63,200 |
| 60 | 1300 | 3820 | 3.3 | 4.8E + 12 | −14.2 | −14.6 | 274,500 |

TABLE 2-3-continued

| Sample Number | Sintering Temperature (° C.) | Permittivity | Tanδ (%) | Resistivity (Ω cm) at Room Temperature | Capacitance Variation ΔC/C$_{25}$ (%) −55° C. | 125° C. | Accelerated Life (sec) |
|---|---|---|---|---|---|---|---|
| 61 | 1300 | 3790 | 3.2 | 3.8E + 12 | −14.5 | −13.9 | 636,400 |
| 62 | 1300 | 3810 | 3.4 | 1.6E + 12 | −14.3 | −13.7 | 503,500 |
| 63 | 1300 | 3840 | 3.2 | 7.4E + 12 | −13.4 | −14.8 | 462,800 |
| 64 | 1300 | 3860 | 3.1 | 8.3E + 12 | −14.1 | −14.4 | 587,700 |
| 65 | 1300 | 3710 | 3.3 | 3.3E + 12 | −13.7 | −14.8 | 1,376,200 |
| 66 | 1300 | 3830 | 3.5 | 8.1E + 11 | −13.9 | −14.1 | 739,900 |
| 67 | 1300 | 3720 | 3.1 | 7.3E + 12 | −13.8 | −14.5 | 356,200 |
| 68 | 1300 | 3620 | 3.3 | 5.5E + 12 | −14.2 | −13.2 | 478,300 |
| 69 | 1300 | 3530 | 3.4 | 2.9E + 12 | −13.7 | −14.6 | 368,400 |
| 70 | 1300 | 3620 | 3.4 | 8.2E + 12 | −13.6 | −13.9 | 635,800 |
| 71 | 1300 | 3580 | 3.4 | 6.1E + 12 | −14.3 | −14.2 | 739,200 |
| 72·X· | 1300 | 3460 | 3.0 | 6.4E + 12 | −14.8 | −14.0 | 642,300 |
| 73·X· | 1300 | 3340 | 2.8 | 8.2E + 12 | −14.2 | −13.6 | 1,738,500 |
| 74·X· | 1300 | 3410 | 3.4 | 4.5E + 12 | −14.5 | −12.5 | 350,600 |
| 75 | 1300 | 3780 | 3.3 | 7.3E + 12 | −14.1 | −13.9 | 227,500 |
| 76 | 1300 | 3850 | 3.4 | 2.7E + 12 | −13.8 | −14.6 | 468,300 |
| 77 | 1300 | 3820 | 3.1 | 6.6E + 12 | −14.3 | −13.6 | 1,045,600 |
| 78 | 1300 | 3840 | 3.2 | 3.1E + 13 | −14.6 | −13.7 | 1,736,500 |
| 79 | 1300 | 3770 | 3.4 | 1.1E + 13 | −14.7 | −14.4 | 1,056,200 |
| 80 | 1300 | 3640 | 3.5 | 4.0E + 13 | −13.9 | −14.9 | 943,600 |
| 81·X· | 1300 | 3660 | 3.5 | 4.4E + 12 | −14.8 | −13.2 | 163,600 |
| 82 | 1300 | 3590 | 3.4 | 8.4E + 13 | −14.5 | −14.9 | 598,700 |
| 83·X· | 1300 | 3660 | 4.8 | 8.5E + 12 | −12.8 | −18.6 | 1,700 |
| 84 | 1300 | 3850 | 3.5 | 5.6E + 12 | −14.5 | −14.6 | 365,200 |
| 85 | 1300 | 3740 | 3.5 | 1.2E + 12 | −14.5 | −15 | 573,800 |

TABLE 2-4

| Sample Number | Sintering Temperature (° C.) | Permittivity | Tanδ (%) | Resistivity (Ω cm) at Room Temperature | Capacitance Variation ΔC/C$_{25}$ (%) −55° C. | 125° C. | Accelerated Life (sec) |
|---|---|---|---|---|---|---|---|
| 86 | 1300 | 3850 | 3.4 | 9.5E + 12 | −14.5 | −14.6 | 356,200 |
| 87 | 1300 | 3760 | 3.5 | 8.6E + 12 | −14.6 | −15 | 104,300 |
| 88·X· | 1300 | Incapable of obtaining a sintered ceramic with high density | | | | | |
| 89·X· | 1300 | Incapable of obtaining a sintered ceramic with high density | | | | | |
| 90 | 1300 | 3880 | 3.4 | 4.8E + 12 | −14.6 | −13.7 | 437,200 |
| 91 | 1300 | 3690 | 3.1 | 7.6E + 12 | −13.8 | −14.8 | 747,800 |
| 92 | 1300 | 3650 | 3.4 | 3.6E + 12 | −14.3 | −14.2 | 457,600 |
| 93 | 1300 | 3710 | 3.4 | 3.7E + 12 | −14.2 | −14.2 | 235,600 |
| 94 | 1300 | 3770 | 3.3 | 9.5E + 11 | −14.2 | −14.5 | 460,400 |
| 95 | 1300 | 3690 | 3.2 | 8.4E + 12 | −13.5 | −14.8 | 467,500 |
| 96 | 1300 | 3730 | 3.3 | 2.6E + 12 | −14.5 | −14.2 | 845,600 |
| 97 | 1300 | 3810 | 3.2 | 4.4E + 12 | −14.2 | −14.8 | 873,500 |
| 98 | 1300 | 3830 | 3.5 | 7.3E + 12 | −13.8 | −14.3 | 630,100 |
| 99 | 1300 | 3690 | 3.2 | 3.3E + 12 | −14.1 | −14.3 | 264,600 |
| 100 | 1300 | 3780 | 3.3 | 8.6E + 11 | −14.8 | −14.9 | 358,300 |
| 101 | 1300 | 3850 | 3.4 | 5.1E + 12 | −14.5 | −14.2 | 356,900 |
| 102 | 1300 | 3920 | 3.2 | 3.0E + 12 | −13.9 | −14.4 | 704,800 |
| 103 | 1300 | 3660 | 3.4 | 7.7E + 12 | −14.6 | −13.8 | 569,400 |
| 104 | 1300 | 3830 | 3.2 | 8.3E + 12 | −14.7 | −13.6 | 479,600 |
| 105·X· | 1300 | 4890 | 28.8 | 8.1E + 10 | −36.2 | 1.7 | 26,300 |
| 106 | 1300 | 3650 | 3.4 | 5.9E + 12 | −14.4 | −13.6 | 264,800 |
| 107 | 1300 | 3520 | 2.9 | 2.9E + 12 | −14.3 | −14.2 | 326,900 |
| 108·X· | 1300 | 3440 | 2.5 | 6.2E + 12 | −13.8 | −14.8 | 105,600 |
| 109·X· | 1300 | Incapable of obtaining a sintered ceramic with high density | | | | | |
| 110 | 1300 | 3850 | 3.4 | 4.2E + 12 | −14.2 | −13.7 | 365,200 |
| 111 | 1300 | 3740 | 3.5 | 8.9E + 12 | −14.7 | −13.9 | 303,500 |
| 112 | 1300 | 3640 | 3.4 | 7.6E + 12 | −14.3 | −14.2 | 402,800 |
| 113·X· | 1300 | 3310 | 3.2 | 6.9E + 12 | −14.8 | −14.4 | 62,300 |

TABLE 2-5

| Sample Number | Sintering Temperature (°C.) | Permittivity | Tanδ (%) | Resistivity (Ω cm) at Room Temperature | Capacitance Variation ΔC/C$_{25}$ (%) -55° C. | 125° C. | Accelerated Life (sec) |
|---|---|---|---|---|---|---|---|
| 114·X· | 1300 | 3690 | 3.4 | 5.4E + 12 | −13.5 | −14.8 | 44,300 |
| 115·X· | 1300 | 3970 | 3.4 | 7.8E + 12 | −14.7 | −14.4 | 179,200 |
| 116·X· | 1300 | 3940 | 3.6 | 8.4E + 12 | −14.7 | −14.9 | 1,430 |
| 117 | 1300 | 3810 | 3.2 | 7.3E + 12 | −14.3 | −15 | 312,900 |
| 118 | 1300 | 3540 | 3.1 | 7.8E + 12 | −13.6 | −14.9 | 726,700 |
| 119 | 1300 | 3590 | 3.4 | 2.2E + 11 | −13.6 | −14.5 | 503,800 |
| 120 | 1300 | 3740 | 3.5 | 7.1E + 11 | −12.3 | −14.4 | 907,500 |
| 121 | 1300 | 3620 | 3.2 | 4.9E + 12 | −13.7 | −13.6 | 930,200 |
| 122 | 1300 | 3720 | 3.4 | 8.2E + 12 | −14.7 | −14.5 | 754,900 |
| 123 | 1300 | 3530 | 3.4 | 5.5E + 12 | −14.6 | −15 | 880,300 |
| 124 | 1300 | 3640 | 3.4 | 4.1E + 12 | −14.3 | −14.4 | 699,800 |
| 125 | 1300 | 3880 | 3.3 | 3.4E + 12 | 7.2 | −14.6 | 856,700 |
| 126 | 1300 | 3510 | 3.1 | 7.3E + 12 | −13.2 | −14.7 | 324,800 |
| 127 | 1300 | 3680 | 3.1 | 1.3E + 11 | −14.6 | −14.3 | 994,000 |
| 128 | 1300 | 3550 | 3.4 | 7.5E + 12 | −14.7 | −14 | 887,500 |
| 129·X· | 1300 | 3420 | 3.1 | 2.5E + 12 | −13.5 | −13.4 | 987,500 |
| 130·X· | 1300 | 3210 | 3.1 | 5.8E + 12 | −12.6 | −13.7 | 1,296,700 |
| 131·X· | 1300 | 3390 | 3.5 | 4.3E + 12 | −13.3 | −14.8 | 230,900 |
| 132 | 1300 | 3790 | 3.4 | 6.4E + 12 | −14.5 | −14.7 | 239,400 |
| 133 | 1300 | 3570 | 3.5 | 3.7E + 13 | −13.7 | −14.2 | 645,500 |
| 134 | 1300 | 3780 | 3.4 | 4.9E + 12 | −14.8 | −14.7 | 1,396,700 |
| 135 | 1300 | 3610 | 3.5 | 8.9E + 12 | −14.6 | −14.8 | 3,005,800 |
| 136 | 1300 | 3640 | 3.3 | 4.5E + 13 | −13.8 | −14.6 | 1,674,700 |
| 137·X· | 1300 | 3520 | 3.9 | 5.8E + 11 | −14.7 | −4.3 | 21,000 |
| 138 | 1300 | 3790 | 3.5 | 7.7E + 13 | −14.6 | −14.8 | 663,800 |
| 139·X· | 1300 | 6030 | 8.9 | 7.6E + 12 | −14.1 | −29.3 | 1,290 |
| 140 | 1300 | 3580 | 3.5 | 7.4E + 12 | −14.6 | −14.5 | 703,700 |
| 141 | 1300 | 3920 | 3.5 | 4.5E + 12 | −14.6 | −14.8 | 553,200 |
| 142 | 1300 | 3630 | 3.4 | 7.3E + 12 | −14.6 | −14.7 | 1,329,700 |

TABLE 2-6

| Sample Number | Sintering Temperature (°C.) | Permittivity | Tanδ (%) | Resistivity (Ω cm) at Room Temperature | Capacitance Variation ΔC/C$_{25}$ (%) -55° C. | 125° C. | Accelerated Life (sec) |
|---|---|---|---|---|---|---|---|
| 143 | 1320 | 3740 | 3.5 | 7.8E + 12 | −14.9 | −14.7 | 664,800 |
| 144·X· | 1320 | Incapable of obtaining a sintered ceramic with high density | | | | | |
| 145·X· | 1320 | Incapable of obtaining a sintered ceramic with high density | | | | | |
| 146 | 1320 | 3840 | 3.5 | 4.3E + 12 | −14.6 | −14.9 | 507,400 |
| 147 | 1320 | 3710 | 3.4 | 5.3E + 12 | −14.8 | −14.7 | 408,300 |
| 148 | 1320 | 4010 | 3.5 | 3.5E + 12 | −14.5 | −14.6 | 498,300 |
| 149 | 1320 | 3740 | 3.5 | 2.8E + 12 | −13.9 | −13.3 | 520,800 |
| 150 | 1320 | 3690 | 3.4 | 7.5E + 12 | −14.9 | −13.1 | 372,500 |
| 151 | 1320 | 3930 | 3.5 | 4.2E + 12 | −14.7 | −14.8 | 479,800 |
| 152 | 1320 | 3900 | 3.5 | 3.2E + 12 | −14.5 | −14.7 | 378,200 |
| 153 | 1320 | 3660 | 3.5 | 5.3E + 12 | −14.6 | −14.9 | 378,200 |
| 154 | 1320 | 3720 | 3.2 | 4.3E + 12 | −14.7 | −14.4 | 593,700 |
| 155 | 1320 | 3800 | 3.1 | 5.8E + 12 | −14.6 | −14.8 | 339,700 |
| 156 | 1320 | 3920 | 3.5 | 6.6E + 11 | −14.4 | −14.6 | 945,700 |
| 157 | 1320 | 3920 | 3.4 | 4.5E + 12 | −14.2 | −14.8 | 519,800 |
| 158 | 1320 | 3890 | 3.4 | 3.6E + 11 | −14.6 | −14.9 | 504,900 |
| 159 | 1320 | 3590 | 3.3 | 9.8E + 12 | −13.9 | −14.7 | 554,300 |
| 160 | 1320 | 3640 | 3.4 | 4.3E + 12 | −14.4 | −14.5 | 387,400 |
| 161·X· | 1320 | 8030 | 11.4 | 7.2E + 11 | −40.5 | 0.4 | 1,200 |
| 162 | 1320 | 3770 | 3.5 | 4.0E + 12 | −14.6 | −14.5 | 337,200 |
| 163 | 1320 | 3730 | 2.7 | 3.5E + 12 | −13.7 | −14.3 | 293,600 |
| 164·X· | 1320 | 2490 | 3.6 | 6.6E + 12 | −13.8 | −16.5 | 1,600 |
| 165·X· | 1320 | Incapable of obtaining a sintered ceramic with high density | | | | | |
| 166 | 1320 | 3740 | 3.4 | 7.5E + 13 | −14.7 | −15 | 447,300 |
| 167 | 1320 | 3740 | 3.4 | 5.6E + 13 | −14.7 | −14.6 | 406,500 |
| 168 | 1320 | 3650 | 3.5 | 3.8E + 13 | −14.4 | −14.6 | 350,700 |
| 169·X· | 1320 | 3120 | 3.2 | 6.9E + 13 | −14.5 | −14.2 | 79,500 |

As clearly seen from Tables 1-1 to 1-6 and Tables 2-1 to 2-6, multilayer ceramic capacitors with highly improved reliability having relative permittivity $\epsilon_s$ equal to or greater than 3500, capacitance variation Δ C/C$_{25}$ within the range from −15% to +15% at temperatures ranging from −55° C. to +125° C., tan δ of 3.5% or less and accelerated life of 200,000 seconds or greater could be obtained from samples sintered in a non-oxidative atmosphere even at a temperature of 1300° C. or lower in accordance with the present invention.

However, samples 1 to 3, 16 to 18, 24, 26, 31, 32, 48, 51, 52, 56 to 59, 72 to 74, 81, 83, 88, 89, 105, 108, 109, 113 to 116, 129 to 131, 137, 139, 144, 145, 161, 164, 165 and 169 (marked with "✕" at the column of sample number in Tables) could not satisfy the above-specified electrical characteristics. Therefore, it appears that such samples fall outside a preferable compositional range of the present invention.

The reasons why the preferable compositional range for dielectric ceramics for use in forming dielectric layers of the multilayer ceramic capacitor in accordance with the present invention should be limited to certain values will now be described. In Tables 1-1 to 1-6, the amount of oxides of Ba and Ti was 100 mole parts in terms of $BaTiO_3$ (i.e., assuming Ba and Ti are in the form of $BaTiO_3$).

First, when the content of an oxide of a rare-earth element represented by Re (Re is selected, e.g., from the group consisting of Sm, Eu, Gd, Th, Dy, Ho, Er, Tm, Yb and Y) is 0 mole parts in terms of $Re_2O_3$ (i.e., assuming the oxide of Re is in the form of $Re_2O_3$ as in the samples 26, 83 and 139, the capacitance variation $\Delta C/C_{25}$ of a produced multilayer ceramic capacitor goes beyond the range from −15% to +15% when temperature varies from −55° C. to +125° C. and a desired accelerated life may not be attained; whereas when the oxide of Re is set to be 0.25 mole parts in terms of $Re_2O_3$ as in samples 27, 84 and 140, the desired electrical characteristics can be successfully obtained.

Further, when the content of the oxide of the rare-earth element Re is equal to or greater than 2.0 mole parts in terms of $Re_2O_3$ as in the samples 31, 32, 88, 89, 144 and 145, highly densified ceramic bodies with a highly enhanced density may not be obtained by the sintering at 1300° C.; whereas when the oxide of the rare-earth element Re is set to be 1.5 mole parts in terms of $Re_2O_3$ as in the samples 30, 87 and 143, the desired electrical characteristics can be successfully obtained.

Accordingly, the preferable range of the total content of the oxide of rare-earth element Re is from 0.25 to 1.5 mole parts in terms of $Re_2O_3$.

It is noted that same effects can be produced regardless of whether a single rare-earth element is used or two or more of rare-earth elements are used together as long as the above-described preferable content range of the rare-earth element Re is satisfied.

When the content of an oxide of Mg is 0 mole parts in terms of MgO, as in the samples 48, 105 and 161, the capacitance variation $\Delta C/C_{25}$ of the produced multilayer ceramic capacitors may exceed the range from −15% to +15% when the temperature varies from −55° C. to +125° C. and the desired accelerated life may not be obtained; whereas when the content of the oxide of Mg is set to be 0.2 mole parts in terms of MgO as in samples 49, 106 and 162, the desired electrical characteristics can be successfully obtained.

In addition, when the content of the oxide of Mg is 2.0 mole parts in terms of MgO as in the samples 51, 108 and 164, the relative permittivity of the produced multilayer ceramic capacitors may become equal to or less than 3500 and the desired accelerated life can not be obtained. Further, the capacitance variation $\Delta C/C_{25}$ sometimes may go beyond the range of −15% to +15% when the temperature varies from −55° C. to 125° C. However, when the content of the oxide of Mg is set to be 1.5 mole parts in terms of MgO as in samples 50, 107 and 163, the desired electrical characteristics can be successfully obtained.

Accordingly, the content of the oxide of Mg optimally ranges from 0.2 to 1.5 mole parts in terms of MgO.

When the content of an oxide of Mn, V or Cr is 0.02 mole parts in terms of $Mn_2O_3$, $V_2O_5$ or $Cr_2O_3$ as in the samples 1 to 3, 57 to 59 and 114 to 116, the desired accelerated life of the produced multilayer ceramic capacitors may not be obtained; whereas when the content of sum of the oxides of Mn, V and Cr is set to be 0.03 mole parts in terms of $Mn_2O_3$, $V_2O_5$ and $Cr_2O_3$ as in the samples 4 to 7, 60 to 63 and 117 to 120, the desired electrical characteristics can be successfully obtained.

Further, when the content of an oxide of the Mn, V, or Cr is 0.7 mole parts in terms of $Mn_2O_3$, $V_2O_5$ or $Cr_2O_3$ as in the samples 16 to 18, 72 to 74 and 129 to 131, the relative permittivity of the produced capacitors becomes equal to or less than 3500. However, when the total content of oxides of Mn, V and Cr is set to be 0.6 mole parts in terms of $Mn_2O_3$, $V_2O_5$ and $Cr_2O_3$ as in samples 12 to 15, 68 to 71 and 125 to 128, the desired electrical characteristics can be successfully obtained.

Accordingly, it is preferable that the total amount of the oxides of Mn, V and Cr ranges from 0.03 to 0.6 mole parts in terms of $Mn_2O_3$, $V_2O_5$ and $Cr_2O_3$.

Further, it is to be noted that same effects can be obtained regardless of whether an oxide of one of the elements Mn, V and Cr is used or two or more thereof are used together as long as the total content thereof satisfies the above specified range, as in the samples 4 to 15, 60 to 71 and 117 to 128.

When the total content of the oxides of Mo and W is 0.4 mole parts in terms of $MoO_3$ and $WO_3$ as in the samples 24, 81 and 137, tanδ of the produced capacitors becomes equal to or greater than 3.5 and the desired accelerated life thereof cannot be obtained. However, if the total content of oxides of Mo and W is set to be 0.3 mole parts in terms of $MoO_3$ and $WO_3$, respectively, as in samples 23, 80 and 136, the desired electrical characteristics can be successfully obtained.

Accordingly, it is preferable that the total content the oxides of Mo and W is between 0 and 0.3 mole parts in terms of $MoO_3$ and $WO_3$.

Furthermore, same effects can be obtained regardless of whether the oxides of Mo and W are used separately as in the samples 20 to 23 and 76 to 80 or used together as in samples 133 to 136 as long as the total content thereof is maintained at or below 0.3 mole parts.

It is more preferable that the total content of the oxides of Mo and W ranges from 0.025 to 0.3 mole parts in terms of $MoO_3$ and $WO_3$ since the addition of Mo and/or W in that range gives rise to a further increased operation and reliability of a ceramic capacitor.

When the ratio of Ba/Ti is 0.960, as in the samples 52, 109 and 165, the sintering at 1300° C. can not produce highly densified ceramic bodies; whereas when the ratio of Ba/Ti is set to be 0.970 as in the samples 53, 110 and 166, the desired electrical characteristics can be successfully obtained.

Moreover, if the ratio of Ba/Ti is 1.040, as in the samples 56, 113 and 169, the desired accelerated life may not be obtained though tan δ of the produced capacitors becomes equal to or less than 3.5. However, when the ratio of Ba to Ti is set to be 1.030 as in samples 55, 112 and 168, the desired electrical characteristics can be successfully obtained.

Accordingly, the optimum ratio of Ba/Ti ranges from 0.970 and 1.030.

Further, Ca or Sr can be used instead of Ba for adjusting Ba/Ti ratio. That is, as long as the ratio of the sum of Ba, Ca and Sr to Ti. i.e., (Ba+Ca)/Ti ratio, (Ba+Sr)/Ti ratio or (Ba+Ca+Sr)/Ti satisfies the optimum range from 0.970 to 1.030, the desired characteristics can be obtained.

Still further, barium carbonate, barium acetate, barium nitrate, calcium acetate, strontium nitrate or the like can be used in controlling the ratio.

The present invention can produce a multilayer ceramic capacitor capable of providing a desired operating life with a highly improved reliability, wherein the capacitor exhibits a relative permittivity $\epsilon_s$ of 3500 or greater, tan $\delta$ of 3.5% or less and a capacitance variation $\Delta$ $C/C_{25}$ ranging from −15% and +15% within the temperature range from −55° C. to +125° C.

Although the present invention has been described with reference to the multilayer ceramic capacitors in this specification, it will be apparent to those skilled in the art that the present invention is also applicable to single layer ceramic capacitors.

While the invention has been shown and described with respect to the preferred embodiments, it will be understood by those skilled in the art that various changes and modifications may be made without departing from the spirit and scope of the invention as defined in the following claims.

What is claimed is:

1. A dielectric ceramic composition comprising:
   100 mole parts of an oxide of Ba and Ti, a ratio Ba/Ti being 0.970 to 1.030;
   0.25 to 1.5 mole parts of an oxide of Re, Re representing one or more elements selected from the group consisting of Sm, Eu, Gd, Tb, Dy, Ho, Er, Tm, Yb and Y;
   0.2 to 1.5 mole parts of an oxide of Mg; and
   0.03 to 0.6 mole parts of an oxide of Mn and oxides of one or more elements selected from the group consisting of V and Cr.

2. The dielectric ceramic composition of claim 1, wherein the content of the oxide of Ba and Ti is calculated by assuming that the oxide of Ba and Ti is $BaTiO_3$; the content of the oxide of Re is calculated by assuming that the oxide of Re is $Re_2O_3$; the content of the oxide of Mg is calculated by assuming that the oxide of Mg is MgO; and the content of oxides of Mn, V and Cr is calculated by assuming that the oxides of Mn, V and Cr are $Mn_2O_3$, $V_2O_5$ and $Cr_2O_3$, respectively.

3. The dielectric ceramic composition of claim 2, further comprising not greater than 0.3 mole parts and greater than 0 mole part oxides of one or two elements selected from the group consisting of Mo and W, the content being calculated by assuming that oxides of Mo and W are $MoO_3$ and $WO_3$, respectively.

4. The dielectric ceramic composition of claim 3, wherein the content of oxides of one or two elements of Mo and W is not less than 0.025 mole parts.

5. The dielectric ceramic composition of claim 1, further comprising not greater than 0.3 mole parts and greater than 0 mole part oxides of one or two elements selected from the group consisting of Mo and W, the content being calculated by assuming that oxides of Mo and W are $MoO_3$ and $WO_3$, respectively.

6. The dielectric ceramic composition of claim 5, wherein the content of oxides of one or two elements of Mo and W is not less than 0.025 mole parts.

7. A ceramic capacitor comprising one or more dielectric layers made of the dielectric ceramic composition of claim 1.

8. The ceramic capacitor of claim 7, wherein the content of the oxide of Ba and Ti is calculated by assuming that the oxide of Ba and Ti is $BaTiO_3$; the content of the oxide of Re is calculated by assuming that the oxide of Re is $Re_2O_3$; the content of the oxide of Mg is calculated by assuming that the oxide of Mg is MgO; and the content of oxides of Mn, V and Cr is calculated by assuming that the oxides of Mn, V and Cr are $Mn_2O_3$, $V_2O_5$ and $Cr_2O_3$, respectively.

9. The ceramic capacitor of claim 8, wherein the dielectric ceramic composition further comprises not greater than 0.3 mole parts and greater than 0 mole part oxides of one or two elements selected from the group consisting of Mo and W, the content being calculated by assuming that oxides of Mo and W are $MoO_3$ and $WO_3$, respectively.

10. The ceramic capacitor of claim 9, wherein the content of oxides of one or two elements of Mo and W is not less than 0.025 mole parts.

11. The ceramic capacitor of claim 7, wherein the dielectric ceramic composition further comprises not greater than 0.3 mole parts greater than 0 mole part oxides of one or two elements selected from the group consisting of Mo and W, the content being calculated by assuming that oxides of Mo and W are $MoO_3$ and $WO_3$, respectively.

12. The ceramic capacitor of claim 11, wherein the content of oxides of one or two elements of Mo and W is not less than 0.025 mole parts.

* * * * *